March 2, 1926.

F. E. GETTS

INSULATION EQUIPMENT

Filed Sept. 21, 1918

Inventor
Frank E. Getts Dec'd
Eva J. Getts Adm'r
By Brown, Manson & Boettcher
Attorneys

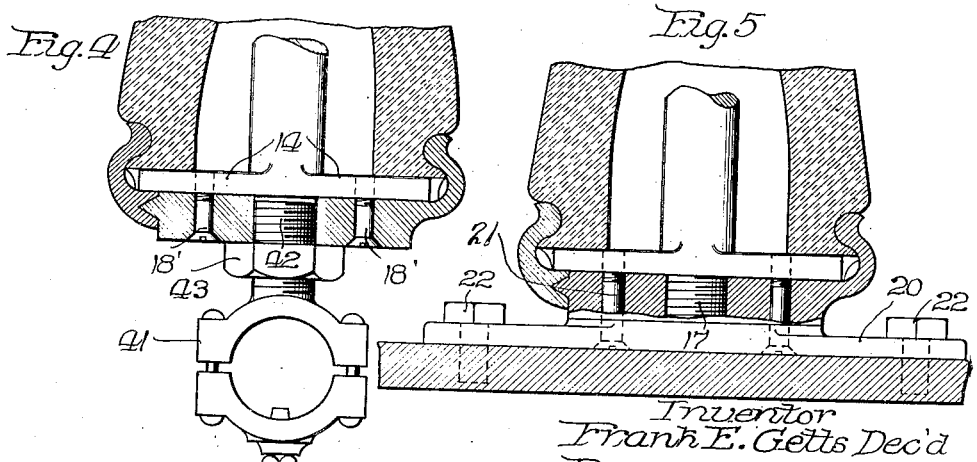

March 2, 1926.
F. E. GETTS
INSULATION EQUIPMENT
Filed Sept. 21, 1918   3 Sheets-Sheet 3
1,574,964
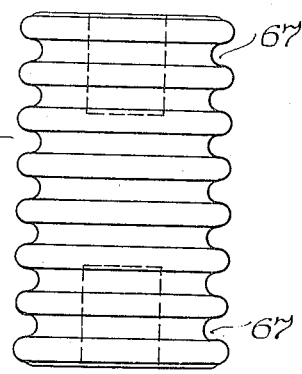
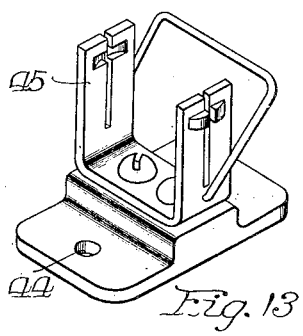
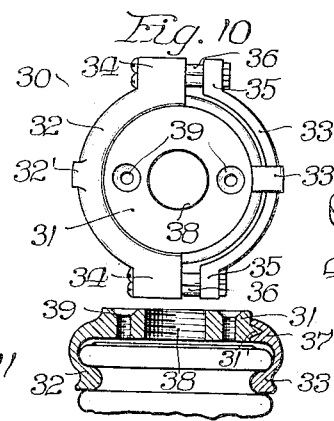
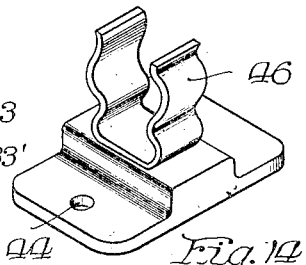
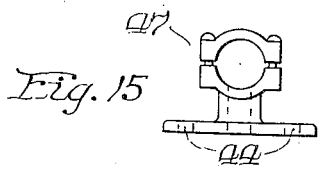
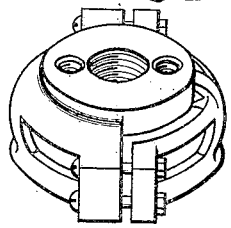
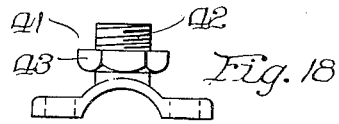
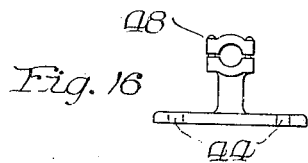
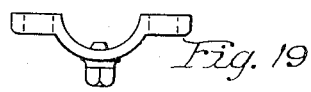
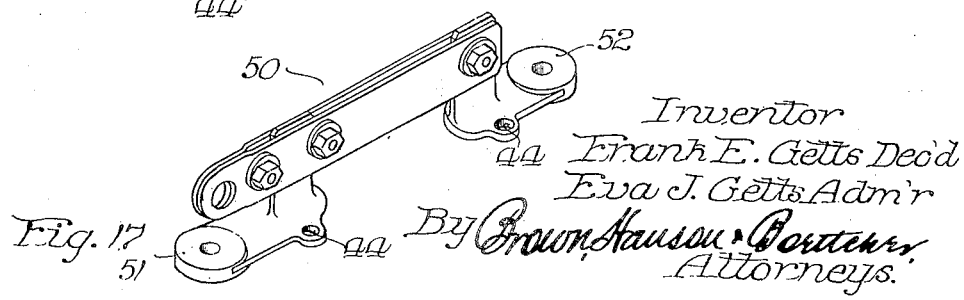
Inventor
Frank E. Getts Dec'd
Eva J. Getts Adm'r
By Brown, Hanson & Borden
Attorneys.

Patented Mar. 2, 1926.

1,574,964

UNITED STATES PATENT OFFICE.

FRANK E. GETTS, DECEASED, LATE OF CHICAGO, ILLINOIS; BY EVA J. GETTS, ADMINISTRATRIX, OF CHICAGO, ILLINOIS, ASSIGNOR TO ELECTRICAL ENGINEERS EQUIPMENT COMPANY, OF CHICAGO, ILLINOIS, A CORPORATION OF ILLINOIS.

INSULATION EQUIPMENT.

Application filed September 21, 1918. Serial No. 255,184.

*To all whom it may concern:*

Be it known that FRANK E. GETTS, late a citizen of the United States, residing at Chicago, in the county of Cook and State of Illinois, deceased, has invented a certain new and useful Improvement in Insulation Equipment, of which the following is a full, clear, concise, and exact description, reference being had to the accompanying drawings, forming a part of this specification.

My invention relates to insulation equipment for electrical purposes.

For mounting and insulating electrical conductors and the various parts of apparatus in a generating and distributing system, a great variety of insulators are commonly required. Because of the different situations and requirements there have been produced great numbers of special parts. Each particular part must be carried in stock, separately ordered and manufactured. This has become almost intolerable.

The aim of my invention is to simplify the situation by providing an insulator and interchangeable fittings so that one insulator may fit a great number of requirements, the only change being in the fittings.

I provide certain interchangeable fittings which permit of a great number of combinations of equipment so that with comparatively few parts equipment can be provided for almost any situation.

I provide as the basis of the equipment an insulator adapted to receive fittings of various character for supporting and insulating the electrical conductors and apparatus.

This is to the end of providing an insulator and mountings which will be universally adaptable to exposed and interior use for the support of line wires, bus bars, bus wires, switches, fuses, choke coils, lightning arrestors, and multitude of other parts or accessories.

A secondary object is to provide an improved clamp which can be clamped to an insulator at top and bottom and which has universal connection for mounting interchangeably the fittings for receiving the switchboard accessories above enumerated.

Another object is to provide an improved supporting pin particularly adapted for co-operative use with the clamp previously mentioned. The pin functions to brace the insulator against stresses tending to tilt the insulator in the clamp and also acts to prevent turning of the insulator in the clamp. The utility of the supporting pin is not confined to its associated use with the clamp as it may be used independently of the clamp if desired.

I preferably construct my improved insulator of the pin or petticoat type as I find these more universally adaptable to exposed and interior use than other types of insulators, owing to the greater weather protection afforded by the petticoats against the collection of moisture, sleet and the like, and the consequently greater leakage resistance of the insulator. It will be apparent, however, that I can construct my insulator in other forms and still realize the present advantages.

In the accompanying drawings in which I have illustrated one particular embodiment of my invention:

Figure 3 is a sectional view of the insulator with clamps applied to both ends thereof and showing the supporting pin cemented in the insulator;

Figure 4 is a similar fragmentary sectional view showing a modified type of pin, and the lower clamp as being mounted upon a pipe clamp;

Figure 5 is another fragmentary sectional view showing the lower clamp as being mounted upon a base plate;

Figure 6 is an isolated elevational view of one type of pin support;

Figure 7 is a fragmentary elevational view of a modified type of pin support;

Figure 8 is an elevational view of a cross pin adapted for use in the clamp on the head of the insulator;

Figure 9 is an elevational view of a different type of insulator to which my improved clamp is also applicable;

Figure 10 is a plan view of the clamp in position upon an insulator;

Figure 11 is a vertical sectional view of the same;

Figure 12 is a perspective view of the clamp;

Figure 13 is a perspective view of a fuse clip fitting and base adapted to be mounted on the insulator clamp;

Figure 14 is a similar view of a different style of clip;

Figures 15 and 16 are elevational views of different sizes of bus wire clamps;

Figure 17 is a perspective view of a disconnect switch adapted for mounting on the insulator clamps;

Figure 18 is an elevational view of the upper half of a pipe support for the insulator;

Figure 19 is a similar view of the lower half;

Fig. 20 is a cross sectional view taken on line 20—20 of Fig. 6.

Figure 2:
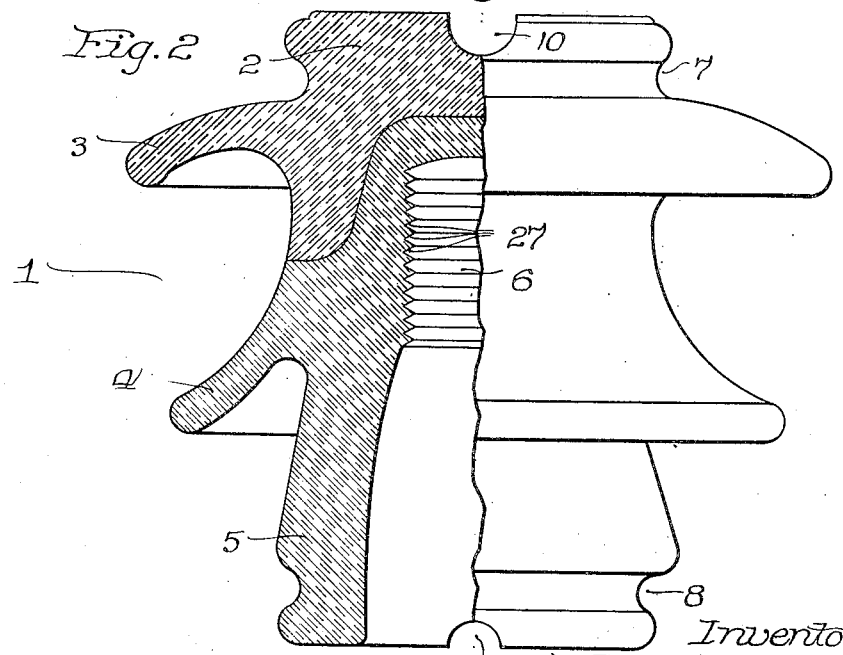
Figure 2 is an enlarged view, partly in section of the improved insulator.

Referring to Figure 2, my improved insulator designated 1 in its entirety, comprises a head portion 2, the petticoats 3 and 4 and the skirt 5, and the socket 6 for the reception of the supporting pin. An annular groove 7 is formed in the head portion 2 of the insulator. A similar groove 8, preferably of the same size and configuration, is formed in the lower end of the skirt 5. The skirt is thickened as will be apparent from the drawings so that the groove 8 may be formed therein and so that the skirt may be strong enough to withstand the circumferential crushing effect of the clamp which engages in the groove 8. A diametrical groove, or depression 10 is formed across the top of the head portion 2 and a similar groove or depression 11 is formed across the bottom of the skirt 5, these grooves lying, preferably but not necessarily, in the same vertical plane. The general configuration of the insulator 1 is not of the essence of my invention and may be of any size or form suitable to the location and exposure of the insulator, and to the voltage of the line or bus to be supported. For instance, the skirt 5 may assume the conformation of a shank portion for the insulator, having the socket 6 in the end thereof, if desired. The high tension petticoat insulator which I employ is built up of two or more separate parts and I cement the parts together into a unitary structure. If one part of an insulator breaks, it is often possible to salvage the unbroken part and employ it again. This is not possible in the indoor or post type of insulator.

Figure 1:
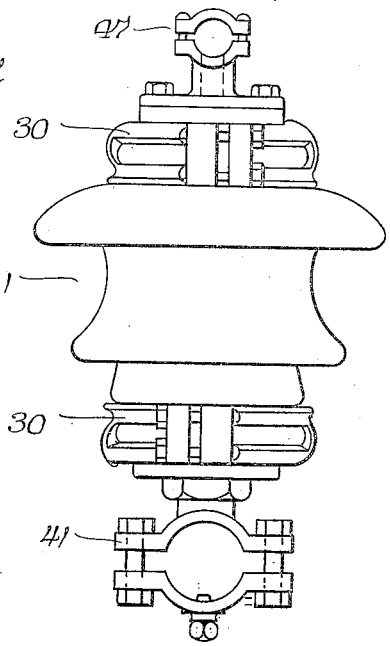
Figure 1 is an elevational view of the insulator having clamps secured to the top and bottom thereof.

To be universally adaptable to all station work, such as bus compartment wiring, outside bus wiring, and the support of station equipment and to all exposed work it is essential that the insulator be capable of assuming an upright, horizontal, or inverted position and that the insulator have interchangeable bases for mounting the insulator upon any available surface or support. The provision of the annular grooves or corrugations 7—8 in the top and bottom of the insulator 1 enables me to secure clamps 30—30 to these portions of the insulator as shown in Figure 1, these clamps being identical and adapted to receive interchangeable mounting bases and fittings for adapting the insulator to any location.

This clamp is illustrated in detail in Figures 10, 11 and 12, and comprises the socket plate 31, the integral semi-circular band 32 and the removable clamping band 33, both bands having lugs or ears 34—35 respectively, through which extend screw bolts 36 which are operable to draw the two bands 32—33 upon the corrugation 7 of the insulator. The socket plate 31 is provided with a small wedge shaped projection 31' adapted to be engaged by a crow-foot formation 37 on the band 33. The socket plate is thus held at opposite points of its periphery by the clamping bands. These bands are preferably slotted from the lugs or ears to a point approximately midway of the band, a narrow strip of metal 32', 33' being retained in each band to prevent spreading of the upper and lower parts of the band. This slotting of the bands removes superfluous metal, gives them certain degree of flexibility and enables them to conform to the corrugation in the end of the insulator. It will be seen that the clamp thus comprises a lower circumferential member which lies within or under the bead of the insulator and an upper or outer circumferential member which lies above or beyond the bead on the insulator. These circumferential members are divided in this case into two parts and have the integral lugs 34—35 common to both circumferential members. Separate bolts are provided in the lugs one for the upper circumferential member and the other for the lower circumferential member so that one or the other of these members may be drawn tighter to a greater degree than the other as may be required for attaching the clamp upon the end of the insulator. The upper circumferential member carries the plate and cooperating jaw member 33' for providing suitable attaching or clamping face to which a device to be supported may be attached or which may be attached to means for supporting the insulator. The narrow strips of metal 32' and 33' which join the upper and lower circumferential members ties the two together but does not prevent independent contraction or expansion of the individual members.

The socket plate 31 has a central socket 38, which is threaded as shown in Figure 11, and has two diametrically opposite screw holes 39—39. All of the fittings and supports illustrated in Figures 13 to 19, inclusive, are attachable to the insulator clamp 30 either by engagement in the central socket 38 or by screwed engagement with the screw holes 39.

For supporting the insulator 1, the clamp 30 may be used with or without the supporting pin. This pin is designated 12 in Figure 3 and comprises the shank portion 13 and the lateral arms 14—14. The head of the pin 12 is secured as by cement 15 in the socket 6 of the insulator. Circumferential and vertical grooves 16 and 16' in the head of the pin, and screw threads 27 in the socket 6 are filled by the cement 15 which hardens therein and rigidly holds the insulator to the pin against twisting and pulling of the same. The screw threads 27 are equally as effective as grooves for this purpose and by their provision the insulator is also adapted for support upon a threaded pin.

The screw socket 6 lies well up in the upper part of the lower section of the insulator so as to afford a support as close as possible to the head of the insulator. The hollow portion or space between the insulator 1 and the pin 12 lies below the screw socket 6 and is adapted to provide an extended surface for insulating purposes when the insulator is employed purely as a pin type insulator. This space also provides clearance for the insertion and fastening of the pin. It is to be noted that the threads 27 make this insulator adaptable to be threaded upon a pin so that the same insulator may be either pin supported or clamped.

The skirt 5 is unsupported internally and hence the same must support both the crushing stresses of the clamp 30 and the stresses imposed by lateral pressure upon the head of the insulator.

The cross arms 14 are semi-circular in section as shown in Fig. 20 and bear in the diametrical groove 11 in the bottom of the insulator 1 where they brace the insulator against tilting and in addition positively prevent turning of the insulator relative to the pin. In one form of pin, a reduced stud end 17 threads into the central socket 38 of the clamp 30. The pin is prevented from turning relative to the clamp by screws 18 passing loosely through the screw holes 39 in the socket plate and threading into holes 26 in the cross arms 14. The screws 18 may be employed for securing the lower clamp upon a supporting panel 19, as indicated in Figure 3.

I preferably employ a modified type of supporting pin which has no stud end 17. This type of pin is illustrated in Figure 7. This arrangement permits engagement of pipe clamps and other types of supporting fittings in the central socket 38, as shown in Figure 4. The cross arms are secured to the clamp by countersunk screws 18'.

The insulator clamp 30 may be mounted upon a base plate 20 (Figure 5) by countersunk screws 21, passing up through the base plate 20, through the screw holes 39 and tapping into the holes 26 in the cross arms 14. This base plate is secured to its supporting surface by cap screws 22.

In applying a clamp to the head of the insulator, I place a cross member 14' in the diametrical groove 10 and secure it to the insulator clamp by screws 18' to prevent relative rotation between insulator and clamp. This cross member is illustrated in Figure 8 and is substantially similar in form to the pair of cross arms 14 on the insulator pin 12.

When it is desired to mount the insulator upon a pipe panel or pipe support, the insulator clamp 30 is equipped with a pipe clamp 41, illustrated in Figures 4, 18 and 19. A threaded stud 42 on the clamp support 41 is adapted to thread into the central socket 38, a jam nut 43 on the stud 42 serving to lock the stud in place in the socket 38. When the insulator 1 is to be positioned upright and supported from below, the pipe clamp 41 is threaded into the bottom insulator clamp 30 as shown in Figure 4 and when the insulator 1 is to be suspended the clamp 41 is threaded into the upper insulator clamp 30. Obviously, numerous other styles of bases for flat surfaces, I-beams and the like having screw studs 42 for engagement in the insulator clamp 30 can be interchangeably employed for the support of the insulator 1. I find this practice of threading the stud 42 into the insulator clamp 30 advantageous in that it facilitates erection of the insulator 1 in positions difficult of access.

The clamp 41 is first applied to the pipe support, the flat surface or the I-beam, as the case may be, and the insulator 1 with the clamp 30 and pin 12 applied is thereafter threaded upon the base 41. Moreover, the insulator can be revolved about its axis to the desired angular position and locked there by the jam nut 43.

In Figures 13 and 14 I have illustrated two fuse clip fittings 45—46 for mounting upon the insulator clamp 30, the former for supporting high tension fuses of a popular make and the latter for supporting the ordinary cartridge fuse. These clips have suitable base portions each of which has two holes 44 for the reception of screws which are adapted to thread into the holes 39 in the insulator clamp 30. For the support of round bus wires, clamps such as are shown in Figures 15 and 16 are employed. These clamps 47—48 are manufactured in several sizes for supporting different sizes of bus wire, the screw holes 44 in the base portions being equi-distantly spaced in all of the sizes so that the several clamps will be interchangeably attachable to the insulator clamp 30. A disconnect switch 50, shown in Figure 17, can be supported upon two spaced insulators 1. The terminal members 51—52 have screw holes 44, similarly to the other fittings, which have screwed connection with the clamps 30 of the spaced insulators 1.

I contemplate the manufacture of the insulator clamp 30 in a plurality of sizes, but with standard size sockets 38 and standard size screw holes 39. Thus, the clamp 30 and all of the various fittings therefor will be applicable, not only to my improved insulator 1 but, to conventional pillar and post insulators of all sizes, as well. In Figure 9 I have illustrated a post insulator 66 and it will be noted that the end corrugations 67 thereof afford the desired clamping surfaces for engagement by my improved insulator clamp 30.

The universality of the combination of the insulator 1, the pin support 12, and the clamp 30 will be apparent. The insulator, clamp and pin combine to produce an insulator unit of high weather resistance and great mechanical strength and rigidity, which are essential to exposed installations. They also produce an insulator unit which is flexible in its ability to assume any position upon any available supporting means and which is universal in its ability to receive interchangeably all fittings for the support of high tension wiring and interior station equipment.

I do not intend to be limited to the particular details herein shown and described, except as defined in the appended claims.

I claim:

1. A petticoat insulator having a plurality of hollow, nested petticoats, the lowermost petticoat having a circumferential groove at the lower end thereof for engagement by an insulator clamp and having depressions in the lower edge thereof, and a cross member to prevent turning of the insulator in the clamp lying in said depressions.

2. In combination, an insulator, a supporting pin having laterally extending arms, said insulator having an axial socket for receiving the supporting pin and having a depression formed diametrically across the bottom thereof for receiving said arms.

3. A pin support for insulators comprising a main standard having a head adapted to be secured into a socket in the insulator, and laterally extending arms on said standard adapted to engage the lower edge of the insulator to support the insulator and to prevent turning of the same.

4. A pin support for insulators comprising a main standard having a head adapted to be secured in a socket in the insulator and laterally extending arms on said standard adapted to engage in a groove in the end of said insulator, said arms having screw holes therein adapted for receiving screws from an insulator clamp.

5. A pin support for insulators comprising a main standard having a head adapted to be secured in a socket in the insulator, laterally extending arms on said standard adapted to engage in a groove in the end of the insulator, and a stud on the end of said standard adapted to engage in a supporting member.

6. In combination, an insulator, a clamp engaging with said insulator, and a pin carried by said clamp engaging in a socket in said insulator.

7. In combination, an insulator, a clamp engaging with said insulator, a pin engaging in a socket in said insulator, said pin having screw threaded connection with said clamp, and laterally extending arms on said pin engaging with said insulator to positively prevent turning of said insulator.

8. In combination, an insulator, a clamp engaging with said insulator, a pin cemented into a socket in said insulator, said pin having laterally extending arms engaging with said insulator to prevent rotation thereof, and screws passing through said clamp and threading into said arms.

9. In combination, an insulator having an end face with a diametrical notch in said end face, a circumferential tension clamp engaging with said insulator and a separate member engaging in said notch in the end of said insulator comprising a short bar, said member having releasable connection with said clamp.

10. In combination, an insulator having an axial recess and a transverse notch across the lower face about the recess, a plate for supporting the insulator, a pin extending at its upper end into the recess and having a pair of arms lying in said transverse notch, means for securing the pin to the plate, and means for holding the insulator with the lower face flat against said plate.

11. In combination, an insulator having an end face, and a transverse groove across the end face, and an axial recess, a reinforcing member comprising a post extending into the recess and secured therein, said post having arms extending into said groove, a base member and means for fastening both the post and the arms to the base member.

12. In combination, a skirted insulator, a rigidly supported insulator pin having laterally extending arms, said insulator having an axial socket for receiving said supporting pin and having a depression formed diametrically across the bottom of the skirt thereof for receiving said arms.

13. In a clamp of the class described for clamping upon a bead on an insulator, a circumferential clamping portion and a mounting portion, said clamping portion comprising an upper and a lower circumferential member, said members being split into segments and having bolting lugs joined together for simultaneously clamping together the upper and lower members, one of said segments carrying said mounting portion, and another of said segments carrying an engaging portion engaging with the upper circumferential member for engaging said mounting portion, said upper circumferential member lying above the bead on the insulator and said lower circumferential member lying below the bead on the insulator.

14. In an insulator clamp for clamping over a bead on the end of an insulator, a first circumferential member lying outside the bead and a second circumferential member lying within the bead, said circumferential members being divided into co-extensive segments having integral bolting lugs, each lug containing a bolt for the upper circumferential member and a bolt for the lower circumferential member, and means carried by the first member for providing a supporting surface.

15. In an insulator clamp for clamping over a bead on the end of an insulator, a first circumferential member lying above the bead, a second circumferential member lying below the bead, both members engaging said bead, said members being divided into two co-extensive segments having integral lugs for bolting the segments together, a bolt for each member in each lug, and cooperating means carried by the first member for providing a supporting surface.

16. In an insulator clamp for clamping over a bead on the end of an insulator, a first circumferential member lying above the bead, a second circumferential member lying below the bead, both members engaging said bead, said members being divided into two co-extensive segments having integral lugs for bolting the segments together, a bolt for each member in each lug, and cooperating means carried by the first member for providing a supporing surface, said members having webs between them for holding the members yieldably together.

17. In combination, an insulator, a supporting pin for said insulator, and a laterally extending arm on said pin adapted to engage in a cooperating depression in said insulator to reinforce the insulator.

18. In combination, an insulator, a supporting pin for said insulator, and laterally extending arms on said pin adapted to engage in cooperating depressions in the end of said insulator to reinforce and prevent turning of the insulator.

19. An insulator comprising a head member, and a lower skirt member, said insulator having a peripheral groove about the head, a peripheral groove about the lower end of the skirt member, and transverse grooves across the head and across the lower edge of the skirt member.

20. An insulator comprising a head member, and a lower skirt member, said insulator having a peripheral groove about the head, a peripheral groove about the lower end of the skirt member, transverse grooves across the head and across the lower edge of the skirt member, said insulator being hollow and being adapted to receive a reinforcing pin.

21. A petticoat insulator comprising a separate head portion having an integral petticoat attached thereto and a separate lower portion comprising a skirt, said portions being rigidly secured together to form a unitary insulator, said head portion and said skirt portion having circumferential grooves formed therein adapted to be engaged by circumferentially extending insulator clamps.

22. A petticoat insulator comprising a separate head portion having an integral petticoat atatached thereto and a separate lower portion comprising a skirt, said portion being rigidly secured together to form a unitary insulator, said head portion and said lower skirt portion having circumferential grooves formed therein adapted to be engaged by circumferentially extending insulator clamps, said grooves being of the same diameter and configuration whereby the insulator clamps are interchangeable.

23. A petticoat insulator comprising a separate head portion having an integral petticoat attached thereto and a separate lower portion comprising a skirt, said portions being rigidly secured together to form a unitary insulator, said head portion and said skirt portion having circumferential grooves formed therein adapted to be engaged by circumferentially extending insulator clamps, said insulator having a groove across the bottom of the lower petticoat for engaging a key member to prevent turning of the insulator in the lower clamp.

24. A petticoat insulator comprising a separate head portion having an integral petticoat attached thereto and a separate lower portion comprising a skirt, said portions being rigidly secured together to form a unitary insulator, said head portion and said skirt portion having circumferential grooves formed therein adapted to be engaged by circumferentially extending insulator clamps, said insulator having grooves across the top of the head, and across the bottom of the skirt for engaging key members to prevent turning of the insulator in the clamp.

25. A petticoat insulator made up of a plurality of petticoats cemented together and having circumferential grooves of substantially the same dimensions and configuration for engagement by similar insulator clamps adjacent the upper and the lower ends only.

26. A petticoat insulator consisting of a plurality of parts, each having petticoats and being cemented together into one unitary member, said insulator having a head portion, an intermediate petticoat and a lower petticoat, said head portion and said lower petticoat comprising different parts of the insulator and having circumferential grooves formed therein to be engaged by similar interchangeable insulator clamps.

27. A petticoat insulator consisting of a plurality of parts, each having petticoats and being cemented together into one unitary member, said insulator having a head portion, an intermediate petticoat and a lower petticoat, said head portion and said lower petticoat comprising different parts of the insulator and having circumferential grooves formed therein to be engaged by similar interchangeable insulator clamps, said lowermost part comprising the lowermost petticoats and having an axial socket for the reception of a pin.

28. A petticoat insulator consisting of a plurality of parts, each having a petticoat and being cemented together into one unitary member, said insulator having a head portion, an intermediate petticoat and a lower petticoat, said head portion and said lower petticoat comprising different parts of the insulator and having circumferential grooves formed therein to be engaged by similar interchangeable insulator clamps, said head and said lowermost petticoat having transverse grooves for the reception of transverse members to prevent turning of the insulator in the clamp.

29. In combination, a body having an axial socket extending from one end toward the other, a boss on the end of said body defining walls closing the end of said socket, and a top piece shaped to fit said boss and prolong the body, the annular lower end of said body and the upper end of said top piece having duplicate irregularities of contour for gripping engagement with interchangeable clamping means.

30. A petticoat insulator having under cut skirt portions and having duplicate grooves at both ends for engagement with interchangeable clamping means.

31. A petticoat insulator having under cut skirt portions and having duplicate grooves at both ends for engagement with interchangeable clamping means, one groove encircling the solid end and the other groove encircling the annular edge of the lower skirt.

In witness whereof, I hereunto subscribe my name this 19th day of September A. D. 1918.

EVA J. GETTS,
*Administratrix for Frank E. Getts, deceased.*